(12) United States Patent
Chien et al.

(10) Patent No.: US 12,450,765 B2
(45) Date of Patent: Oct. 21, 2025

(54) METHOD FOR TRAINING DEPTH RECOGNITION MODEL, ELECTRONIC DEVICE, AND STORAGE MEDIUM

(71) Applicant: HON HAI PRECISION INDUSTRY CO., LTD., New Taipei (TW)

(72) Inventors: Shih-Chao Chien, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 270 days.

(21) Appl. No.: 18/089,021

(22) Filed: Dec. 27, 2022

(65) Prior Publication Data

US 2024/0046495 A1 Feb. 8, 2024

(51) Int. Cl.
*G06N 3/08* (2023.01)
*G06T 7/55* (2017.01)
*G06T 7/60* (2017.01)
*G06T 7/73* (2017.01)
*G06V 10/40* (2022.01)
*G06V 10/764* (2022.01)
*G06V 10/774* (2022.01)
*G06V 10/82* (2022.01)
*G06V 20/56* (2022.01)

(52) U.S. Cl.
CPC .............. *G06T 7/55* (2017.01); *G06T 7/60* (2013.01); *G06T 7/73* (2017.01); *G06V 10/774* (2022.01); *G06T 2207/20068* (2013.01); *G06T 2207/20081* (2013.01); *G06T 2207/30244* (2013.01); *G06V 2201/08* (2022.01)

(58) Field of Classification Search
CPC .. G06V 10/774; G06V 2201/08; G06V 20/56; G06V 20/588; G06V 10/40; G06V 10/764; G06V 10/82; G06T 2207/20084; G06T 2207/30252; G06T 7/55; G06T 7/60; G06T 7/73; G06T 2207/20068; G06T 2207/20081; G06T 2207/30244; G06N 3/08
See application file for complete search history.

(56) References Cited

U.S. PATENT DOCUMENTS

| 2017/0084038 A1* | 3/2017 | Dane | G06V 20/56 |
| 2023/0186587 A1* | 6/2023 | Shrivastava | B60W 10/20 |
| | | | 382/100 |

\* cited by examiner

*Primary Examiner* — John Villecco
*Assistant Examiner* — Kyla Guan-Ping Tiao Allen
(74) *Attorney, Agent, or Firm* — ScienBiziP, P.C.

(57) ABSTRACT

A method for training a depth recognition model implemented in an electronic device includes determining test objects from test images, and obtaining a first image and a second image; calculating a test projection slope of each test object according to coordinates of each pixel point of each test object in the test images; generating a threshold range according to the plurality of test projection slopes; recognizing a type of terrain corresponding to a position of each initial object; adjusting an initial ground area in the first image, and obtaining a target ground area in the first image; generating a target height loss of a preset depth recognition network, an initial depth image corresponding to the first image, and the target ground area; and adjusting the preset depth recognition network according to the target height loss and a depth loss, and obtaining a depth recognition model for recognizing depth of images.

20 Claims, 5 Drawing Sheets

METHOD FOR TRAINING DEPTH RECOGNITION MODEL, ELECTRONIC DEVICE, AND STORAGE MEDIUM

FIELD

The subject matter herein generally relates to a technology of image processing, and particularly to a method for training a depth recognition model, an electronic device, and a storage medium.

BACKGROUND

For vehicles in motion, using images of the ground ahead and identifying obstacles therein and distances from the obstacles requires accuracy for the sake of safety, but when being trained a depth recognition network can be affected due to various types of terrain in the training images. Fox example, the terrain may include uphill and downhill stretches, this can cause low recognition accuracy of the trained depth recognition model, thereby acquiring inaccurate depth and distance prediction.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
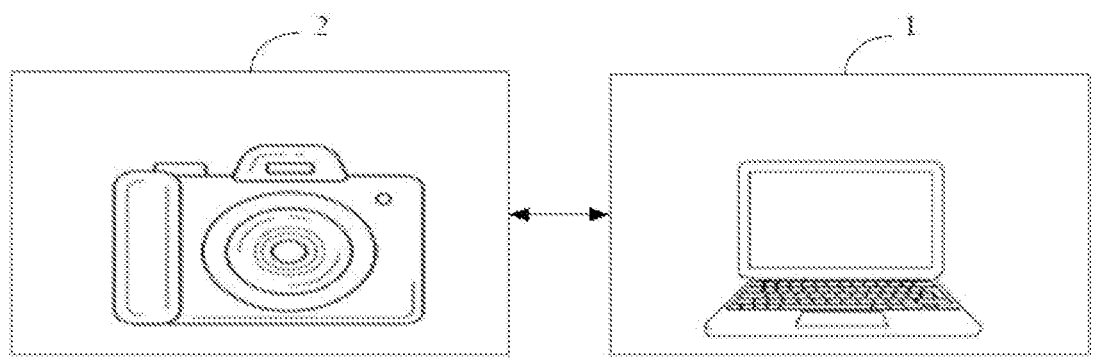
FIG. 1 is a block diagram of an embodiment of application environment of a method for training a depth recognition model according to the present disclosure.

Plurality of embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may present methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those of skill in the art may readily understand that these orders may vary and still remain within the essence and scope of the embodiments of the present disclosure.

Unless otherwise defined, technical terms or scientific terms used in the embodiments shall have common meanings as construed by those of ordinary skills in the art to which the present disclosure pertains. The terms "first", "second" and the like used in the embodiments of the present disclosure do not represent any order, quantity, or importance, but are merely used to distinguish between different components. The terms "include", "contain" or the like mean that elements or articles appearing before such terms may cover elements or articles listed after the words and their equivalents without excluding other elements or articles. The terms "connect", "link" or the like are not limited to physical or mechanical connection, but may include electrical connections, whether direct or indirect.

Referring to FIG. 1, an electronic device 1 communicates with a camera device 2. The electronic device 1 may be an electronic device with a model training program and an image depth recognition program installed, such as a personal computer, a server, etc., the server may be a single server, a server cluster, or the like. The camera device 2 can be a monocular camera.

In one embodiment, the electronic device 1 can be in a wired network environment or a wireless network environment, the electronic device 1 communicates with the camera device 2 through the wired network or the wireless network. The wireless network can be radio, WI-FI, or cellular network. The cellular network can be a 4G network or a 5G network.

In one embodiment, the electronic device 1 may include at least one network device and/or at least one user device. The network device includes, but is not limited to, a single network server, a server group including a number of network servers, or cloud computing including a large number of hosts or web servers based on cloud computing.

Figure 2:
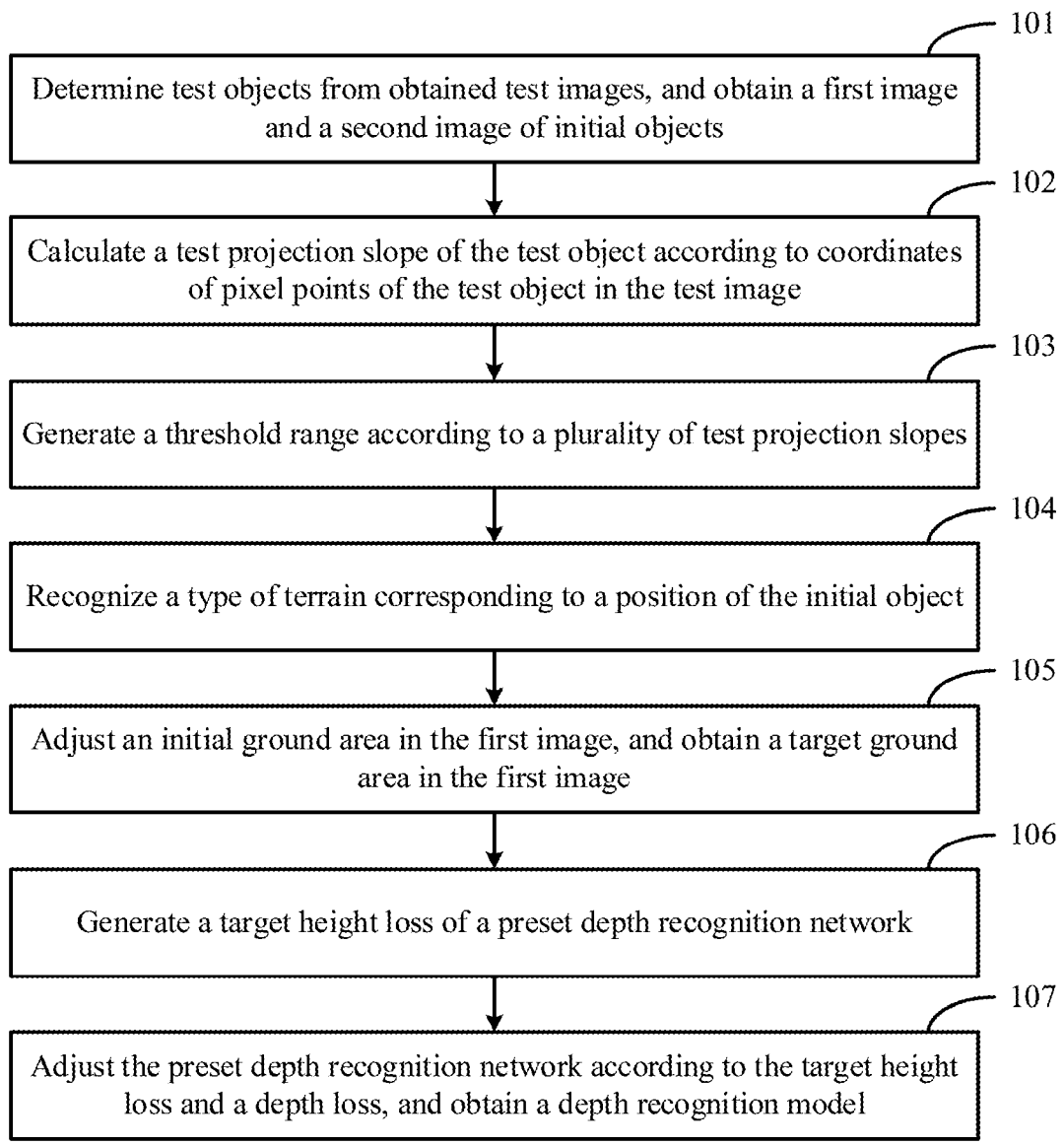
FIG. 2 illustrates a flowchart of an embodiment of a method for training a depth recognition model according to the present disclosure.

FIG. 2 illustrates a flowchart of an embodiment of a method for training a depth recognition model. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, determining test objects from obtained test images, and obtaining a first image and a second image generated by the camera device capturing a plurality of initial objects.

In one embodiment, the camera device may be a monocular camera, the first image and the second image are images of three primary colors (Red Green Blue, RGB) of adjacent frames, and a capturing time of the second image is later than a capturing time of the first image.

In one embodiment, determining test objects from obtained test images includes: obtaining an instance segmentation network and the test images, performing an instance segmentation process on the test images by using the instance segmentation network, and obtaining the test objects.

In one embodiment, the instance segmentation network may be a Mask R-CNN, YOLCAT, PolarMask etc., the instance segmentation network is the prior art, which is not described in detail. The test images each includes a horizontal ground and at least one test object, and the test object can be an object on the horizontal ground in the test image. For example, the test object may be a vehicle on the horizontal ground.

In one embodiment, obtaining a first image and a second image generated by the camera device capturing a plurality of initial objects includes: controlling the camera device to capture the image of a plurality of initial objects, and obtaining the first image, controlling the camera device to capture the image of the plurality of initial objects after a preset time interval, and obtaining the second The plurality of initial objects may be vehicles, the first image and the second image can further include ground, pedestrians, sky, and trees. It can be understood that the preset time interval is relatively short, for example, the preset time interval may be 10 ms.

In one embodiment, the image of the plurality of initial objects are captured after the preset time interval to obtain the second image. Since the preset time interval is short, any distance of movement of the initial object is small, therefore, there will more initial objects which are identical in the second image and the first image.

At block 102, calculating a test projection slope of the test object according to the coordinates of pixel points of the test object in the test image, and obtaining a plurality of test projection slopes of the test objects in the test images.

In one embodiment, the test projection slope is the degree of inclination relative to the horizontal ground. In one embodiment, calculating a test projection slope of the test object according to the coordinates of pixel points of the test object in the test image includes: obtaining an abscissa value and an ordinate value of each pixel point of the test object, calculating an average abscissa value of all the abscissa values, calculating an average ordinate value of all the ordinate values, calculating an abscissa difference value between the abscissa value of each pixel point and the average abscissa value, and calculating an ordinate difference value between the ordinate value of each pixel point and the average ordinate value; determining the quantity of pixel points of the test object, generating a covariance matrix according to a preset rule, the quantity of pixel points, a plurality of abscissa difference values, and a plurality of ordinate difference values, obtaining a feature vector by performing singular value decomposition on the covariance matrix, determining a ratio of a first vector element to a second vector element of the feature vector to be the projection slope, and selecting the test projection slope from a plurality of projection slopes.

In one embodiment, the abscissa values and the ordinate values are the coordinates of each pixel point of the test image in the pixel coordinate system corresponding to the test image.

In detail, generating a covariance matrix according to a preset rule, the quantity of pixel points, a plurality of abscissa difference values, and a plurality of ordinate difference values includes: calculating an abscissa variance value according to the plurality of abscissa difference values and the quantity of pixel points, calculating an ordinate variance value according to the plurality of ordinate difference values and the quantity of pixel points, calculating a covariance value according to the quantity of pixel points, the plurality of abscissa difference values, and the plurality of ordinate difference values, and determining the covariance matrix by arranging the covariance value, the abscissa variance value, and the ordinate variance value according to the preset rule.

The preset rule includes taking the abscissa variance value and the ordinate variance value as matrix elements on a main diagonal of the covariance matrix, and taking the covariance value as matrix elements on a sub-diagonal of the covariance matrix.

In one embodiment, since there are a number of feature vectors, there are also a number of projection slopes, and there are projection slopes that are greater than or less than zero. The coordinate value of each pixel point of the test image in the pixel coordinate system being greater than zero, therefore, the electronic device selects a projection slope greater than zero as the test projection slope.

For example, the quantity of pixels of all the pixels representing the test object is 5, and the pixel coordinate values of the 5 pixels are shown in Table 1:

TABLE 1

| | | Coordinate values of pixel points | | | | |
|---|---|---|---|---|---|---|
| Pixel | Abscissa value | Average abscissa value | Abscissa difference value | Ordinate value | Average ordinate value | Ordinate difference value |
| 1 | 2 | 2.6 | −0.6 | 2 | 2.8 | −0.8 |
| 2 | 2 | | −0.6 | 3 | | 0.2 |
| 3 | 3 | | 0.4 | 2 | | −0.8 |
| 4 | 3 | | 0.4 | 4 | | 1.2 |
| 5 | 3 | | 0.4 | 3 | | 0.2 |

In one embodiment, the abscissa variance value is calculated by the following formula (1):

$$\mathrm{Var}(x) = \frac{1}{n}\sum_{i=1}^{n} x_i^2; \qquad (1)$$

in the formula (1), Var(x) represents the abscissa variance value, n represents the quantity of pixel points, and $x_i$ represents the i-th abscissa variance value. The formula for calculating the variance value of the ordinate is the same as that of the variance value of the abscissa. According to the above formula (1), it can be calculated that the abscissa variance value is 0.24, and the ordinate variance value is 0.56.

In one embodiment, the covariance value is calculated by the following formula (2):

$$\mathrm{cov}(x, y) = \frac{1}{n}\sum_{i=1}^{n} x_i y_i; \qquad (2)$$

in the formula (2), cov(x,y) represents the covariance value, n represents the quantity of pixels, $x_i$ represents the i-th abscissa variance value, and yi represents the i-th ordinate variance value. According to the above formula (2), the covariance value can be calculated as 0.12. Taking the abscissa variance value of 0.24 and the ordinate variance value of 0.56 as the elements on the main diagonal, and the covariance value of 0.12 as the elements on the sub-diagonal, the covariance matrix can be determined as:

$$Q = \begin{bmatrix} 0.24 & 0.12 \\ 0.12 & 0.56 \end{bmatrix}.$$

A first feature vector can be determined as $$\begin{bmatrix} 0.3162 \\ 0.9487 \end{bmatrix},$$

and a second feature vector can be determined as $$\begin{bmatrix} 0.9487 \\ -0.3162 \end{bmatrix}$$

after the singular value decomposition on the covariance matrix Q, the first ratio of the first vector element of the first feature vector to the second vector element of the first feature vector is calculated to be +0.33, and the second ratio of the first vector element of the second feature vector to the second vector element of the second feature vector is calculated to be −3. Since the coordinate values of five pixel points are all greater than zero, the first ratio+0.33 is selected as the test projection slope of the test object.

In one embodiment, since the test projection slope refers to the degree of inclination of the position of the test object relative to the horizontal ground, the type of terrain of the initial object can be preliminarily determined according to the test projection slope.

At block 103, generating a threshold range according to a plurality of test projection slopes.

In one embodiment, the threshold range is a range of the initial projected slopes of the test object on the horizontal ground. In one embodiment, generating a threshold range according to a plurality of test projection slopes includes: calculating a projection average value and a projection standard deviation of the plurality of test projection slopes, calculating a configuration value according to the projection standard deviation, determining a difference value between the projection average value and the configuration value to be a minimum threshold value, determining a sum of the projection average value and the configuration value to be a maximum threshold value, and determining the range formed by the minimum and maximum threshold values as being the threshold range.

The configuration value may be a multiple of the projection standard deviation. For example, the configuration value may be twice the projection standard deviation.

According to the above-mentioned embodiment, the minimum threshold value and the maximum threshold value are generated from the projected average value and the configuration value, and the range formed by the minimum threshold value and the maximum threshold value is determined as the range of the threshold value, which can be expanded. The error tolerance of the threshold value range can be improved. Since the projection average value and the configuration value can reduce error of the plurality of test projection slopes, the rationality of the threshold value range is improved.

At block 104, recognizing a type of terrain corresponding to the position of the initial object according to the initial projection slope of the initial object in the first image and the threshold range.

In one embodiment, the type of terrain includes flat ground and slope, the flat ground refers to the horizontal ground, and the slope refers to a ground at an inclination angle to the horizontal ground, the slope can be up or down slope.

In one embodiment, recognizing a type of terrain corresponding to the position of the initial object according to the initial projection slope of the initial object in the first image and the threshold range includes: when the initial projection slope is within the threshold range, determining that the type of terrain is the flat ground, or, when the initial projection slope is not within the threshold range, determining the type of terrain as being the slope.

Through the above-mentioned embodiment, recognition of whether the type of terrain of the initial image is up or down slope is performed according to the initial projection slope corresponding to the initial object in the first image and the threshold range, since the threshold range has higher fault tolerance, the type of terrain corresponding to the position of the initial object can be accurately determined.

At block 105, adjusting an initial ground area in the first image according to the type of terrain and the pixel coordinates of the initial object, and obtaining a target ground area in the first image.

Figure 3:
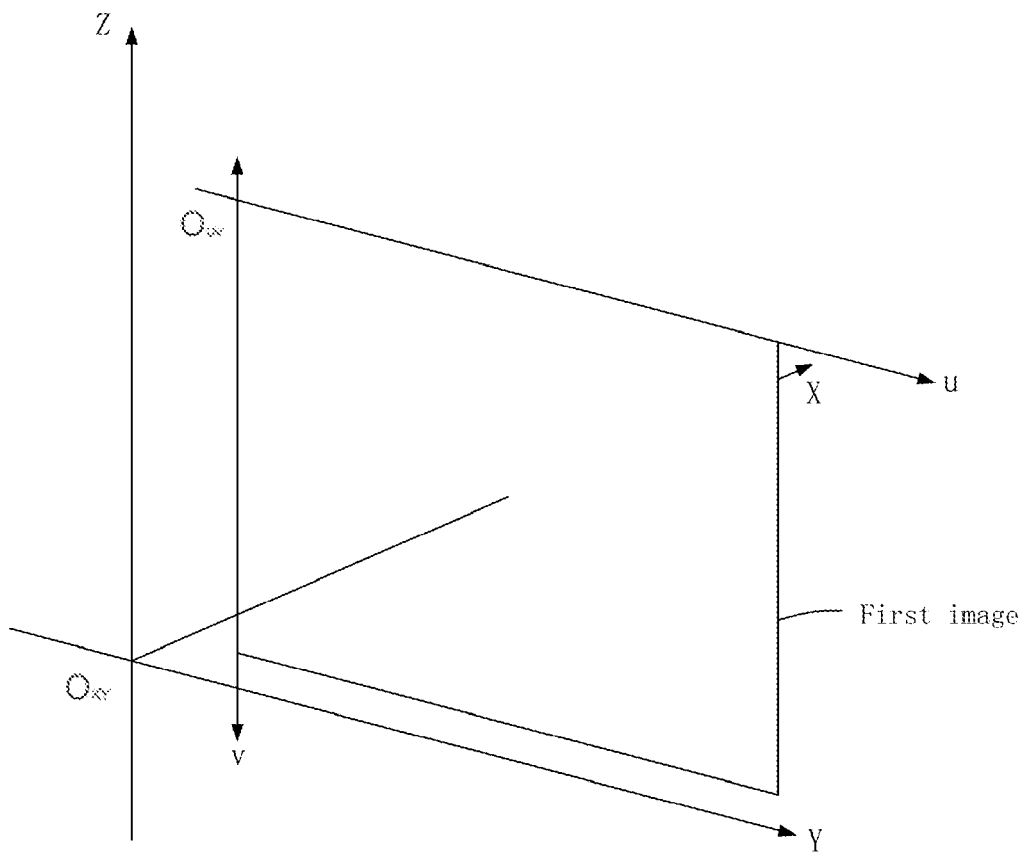
FIG. 3 is a schematic view of an embodiment of a pixel coordinate system and a camera coordinate system according to the present disclosure.

Referring to FIG. 3, the electronic device takes the pixel point $O_{uv}$ in the first row and the first column of the first image as the origin, takes the parallel line where the pixel points of the first row are located as the u-axis, and takes the vertical line where the pixel points of the first column are located as the v-axis, to form the pixel coordinate system of the first image. For example, the first pixel point in the upper left corner can be used as the origin. In addition, the electronic device takes the light spot $O_{XY}$ of the monocular camera as the origin, takes the optical axis of the monocular camera as the X-axis, and takes the line parallel to the u-axis of the pixel coordinate system of the first image as Y-axis, and takes the parallel line of the v-axis of the pixel coordinate system of the first image as the Z-axis, to form the camera coordinate system.

In one embodiment, the initial ground area refers to a ground area generated after segmenting the first image by using a ground segmentation network, the ground segmentation network may be obtained from an Internet database. For example, the ground segmentation network may be a High-Resolution Net v2 (HRNet v2).

In one embodiment, adjusting an initial ground area in the first image according to the type of terrain and the pixel coordinates of the initial object, and obtaining a target ground area in the first image includes: recognizing a feature ground area corresponding to any initial object in the initial ground area according to the pixel coordinates of any initial object, when the type of terrain corresponding to any initial object is the flat ground, determining the feature ground area to be the target ground area, or, when the type of terrain corresponding to any initial objects is the slope, obtaining the target ground area by performing a mask process on the feature ground area in the initial ground area.

In detail, recognizing a feature ground area corresponding to any initial object in the initial ground area according to the pixel coordinates of any initial object includes: obtaining the ground coordinate of each ground pixel point in the initial ground area in the pixel coordinate system of the first image, obtaining the initial pixel coordinate of each initial pixel point of any initial object in the pixel coordinate system of the first image, calculating a pixel distance between each initial pixel coordinate and the coordinates of the origin in the pixel coordinate system of the first image, determining the initial pixel coordinate corresponding to a maximum pixel distance, and determining the area formed by the ground pixel points corresponding to the ground coordinates between the coordinate of the origin and the initial pixel coordinate corresponding to the maximum pixel distance to be the feature ground area.

In this embodiment, the area formed by the ground pixel points corresponding to the ground coordinates between the coordinate of the origin and the initial pixel coordinate corresponding to the maximum pixel distance is determined as the feature ground area, accurately determining the position of the ground on the up and down slope in the first image.

At block 106, generating a target height loss of a preset depth recognition network based on the preset depth recognition network, the camera device, the initial depth image of the first image, and the target ground area.

In one embodiment, the depth recognition network refers to a network capable of recognizing depth of an image, the initial depth image refers to an image including depth information of the first image, and the depth information refers to the distance between the initial object corresponding to each pixel point in the first image and the camera device that captured the first image.

In one embodiment, the target height loss refers to a difference between the predicted height and the real-world height, the predicted height refers to the distance between each pixel point in the first image and the camera device predicted by the depth recognition network, and the real-world height refers to the distance between the initial object corresponding to the pixel points in the first image and the camera device in real world.

In one embodiment, generating a target height loss of the depth recognition network based on the preset depth recognition network, the camera device, the initial depth image corresponding to the first image, and the target ground area includes: obtaining the real-world height from the optical center of the camera device to the target ground area, constructing a camera coordinate system based on the first image and the camera device, calculating the projection height according to the coordinate of each ground pixel point of the target ground area in the first image in the camera coordinate system, and calculating the target height loss according to the pixel coordinates of the pixel points in the initial depth image, the projection height, and the real-world height.

In one embodiment, the initial depth image is obtained by inputting the first image into the depth recognition network. In detail, calculating the projection height according to the coordinate of each ground pixel point of the target ground area in the first image in the camera coordinate system includes: obtaining the coordinate of any ground pixel point in the target ground area in the camera coordinate system, calculating the unit normal vector according to the coordinate of any ground pixel point, determining the vector formed by the optical center of the camera device as the starting point and each ground pixel point as the end point as the target vector of the ground pixel point, calculating the projection distance corresponding to each ground pixel point according to the target vector of each ground pixel point and the unit normal vector, and obtaining the projection height by performing a weighted average operation on the projection distances corresponding to all ground pixel points. In one embodiment, the unit normal vector is calculated by the following formula (3):

$$N_t = (P_t P_t^T)^{-1} P_t \quad (3);$$

in the formula (3), $N_t$ refers to the unit normal vector, $P_t$ refers to the coordinate of any ground pixel point in the target ground area in the camera coordinate system, and $P_t^T$ refers to the target vector.

In this embodiment, the projection height refers to the weighted average value of a plurality of projection distances between each pixel point in the first image and the camera device. Since the coordinates of all the pixel points in the ground area are involved in the calculation, the projection height can be made more accurate.

In detail, calculating the target height loss according to the pixel coordinates of the pixel points in the initial depth image, the projection height, and the real-world height includes: calculating a height ratio of the real-world height to the projection height, obtaining the depth coordinate corresponding to each pixel point by multiplying the height ratio with the pixel coordinate of each pixel point in the initial depth image, generating a first height loss according to the pixel coordinate and the corresponding depth coordinate of each pixel point in the initial depth image, obtaining a multiplication matrix by multiplying the translation matrix with the height ratio, generating a second height loss according to the multiplication matrix and the translation matrix, and generating the target height loss according to the first height loss and the second height loss.

In detail, the first height loss is calculated by the following formula (4):

$$L_d = \sum_{i=1}^{n} \frac{|D_t^i(u, v) - D^i(u, v)|}{D(u, v)}; \quad (4)$$

in the formula (4), $L_d$ refers to the first height loss, n refers to the quantity of all pixel points in the initial depth image, i refers to the i-th pixel in the initial depth image, $D_t^i(u,v)$ refers to the depth coordinate corresponding to the i-th pixel in the initial depth image, and $D^i(u, v)$ refers to the pixel coordinate of the i-th pixel in the initial depth image.

In detail, the second height loss is calculated by the following formula (5):

$$L_{ts} = |t_s - t| \quad (5);$$

in the formula (5), $L_{ts}$ refers to the second height loss, $t_s$ refers to the multiplication matrix, and t refers to the translation matrix.

The target height loss is obtained by performing a weighted average operation on the first height loss and the second height loss.

Through the above embodiment, the target height loss is calculated according to the pixel coordinates of the pixel points in the initial depth image, the projection height, and the real-world height. Since the projection height is more accurate, the target height loss can be reduced faster.

At block 107, adjusting the preset depth recognition network according to the target height loss and the depth loss generated based on the first image and the second image, and obtaining a depth recognition model.

In one embodiment, the depth loss includes a luminosity loss and a gradient loss. The depth recognition model refers to a model generated by adjusting the depth recognition network.

In one embodiment, adjusting the depth recognition network according to the target height loss and the depth loss generated based on the first image and the second image, and obtaining a depth recognition model includes: calculating an overall loss of the depth recognition network based on the depth loss and the target height loss, adjusting the depth recognition network based on the overall loss until the overall loss decreases to the minimum, and obtaining the depth recognition model.

In detail, the electronic device performs the weighted average operation on the depth loss and the target height loss to obtain the overall loss.

In this embodiment, the overall loss includes the depth loss and the target height loss. Since the depth loss accurately reflects the differences between the first image and the second image, adjusting the deep network by the overall loss improves the learning ability of the deep network, so there will be better recognition accuracy of the depth recognition model.

In detail, the electronic device calculates the gradient loss between the initial depth image and the first image, and calculates the luminosity loss between the projection image of the first image and the first image, and further, the electronic device performs the weighted average operation on the gradient loss and the luminosity loss to obtain the depth loss.

The electronic device generates the projection image of the first image based on the first image, the initial depth image corresponding to the first image, and the pose matrix corresponding to the first image and the second image. The process of generating the pose matrix is in the prior art, and details are not described.

In detail, the luminosity loss is calculated by the following formula (6):

$$Lt = \alpha SSIM(x,y) + (1-\alpha)\|x_i - y_i\| \quad (6);$$

in the formula (6), $L_t$ represents the luminosity loss, $\alpha$ is a preset balance parameter generally taking a value of 0.85, $SSIM(x, y)$ represents a structural similarity index between the projection image and the first image, $\|x_i - y_i\|$ represents a grayscale difference between the projection image and the first image, $x_i$ represents the pixel value of the i-th pixel point in the projection image, and $y_i$ represents the pixel value of the i-th pixel point corresponding to the i-th pixel point in the first image. The process of calculating the structural similarity index is in the prior art, which is not repeated.

In detail, the gradient loss is calculated by the following formula (7):

$$Ls = \sum_{i \in \{x,y\}} \left| \partial_i \left( \frac{1}{D(u,v)} \right) \right| e^{-\|\partial_i I(u,v)\|}; \quad (7)$$

in the formula (7), $L_s$ represents the gradient loss, x represents the initial depth image, y represents the first image, $D(u, v)$ represents the pixel coordinate of the i-th pixel in the initial depth image, and $I(u, v)$ represents the pixel coordinate of the i-th pixel in the first image.

In this embodiment, since the depth loss includes changes in the luminosity and gradient of each pixel point in the first image to the corresponding pixel in the second image, the depth loss reflects more accurately the differences between the first image and the second image.

Figure 4:
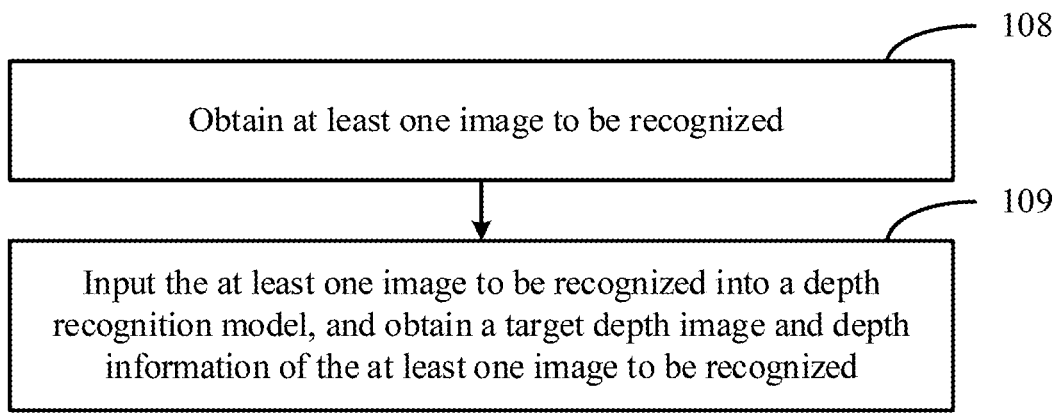
FIG. 4 illustrates a flowchart of an embodiment of a method for recognizing depth of images according to the present disclosure.

FIG. 4 illustrates a flowchart of an embodiment of a method for recognizing depth of images. The method is provided by way of example, as there are a variety of ways to carry out the method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 108.

At block 108, obtaining at least one image to be recognized.

In one embodiment, obtaining at least one image to be recognized includes: obtaining the at least one image to be recognized from a preset database. The preset database may be a KITTI database, a Cityscapes database, a vKITTI database, or the like. The depth recognition network can be a deep neural network, and the depth recognition network can be obtained from a database on the Internet.

At block 109, inputting the at least one image to be recognized into the depth recognition model, and obtaining the target depth image and the depth information of the at least one image. The depth recognition model is determined by performing the above method for training a depth recognition model.

In one embodiment, the target depth image refers to an image including depth information of each pixel point in the image to be recognized, and the depth information of each pixel point in the image to be recognized refers to the distance between the object to be recognized corresponding to each pixel point in the image to be recognized and the camera device capturing the image.

In one embodiment, the method of generating the target depth image is the same as that of the initial depth image, which will not be repeated.

In one embodiment, the electronic device obtains the pixel value or pixel coordinate of each pixel point in the target depth image as the depth information of the corresponding pixel point in the image to be recognized.

Through the above-mentioned embodiments, since the precision of the depth recognition model is improved, the accuracy of depth perception in relation to the image to be recognized can be improved.

In conclusion, in the present disclosure, the test projection slope of the test object is calculated according to the coordinates of the pixel points of the test object in the test image, and the threshold range is generated according to a plurality of test projection slopes. The type of terrain corresponding to the location of the test object is flat ground, therefore, the threshold range provides a reference range for the initial projection slope of the initial object, thus avoiding a single extremum of the test projection slope, the rationality of the threshold range is improved. Whether the type of terrain corresponding to the location of the initial object is an up slope or a down slope is recognized according to the initial projection slope of the initial object in the first image and the threshold range, and then, according to the type of terrain and the pixel coordinates of the initial object, the initial ground area in the first image is adjusted, so that the area corresponding to the initial object on the up or down slopes can be filtered out, so that the target ground area does not contain an up or down slope. When the target height loss of the depth recognition network is calculated by using the target ground area, the influence of a change of the pixel value of the pixel points in the up or down slope on the target height loss is avoided. The recognition accuracy of the trained depth recognition model is higher, so that recognition accuracy of the image is improved.

Figure 5:
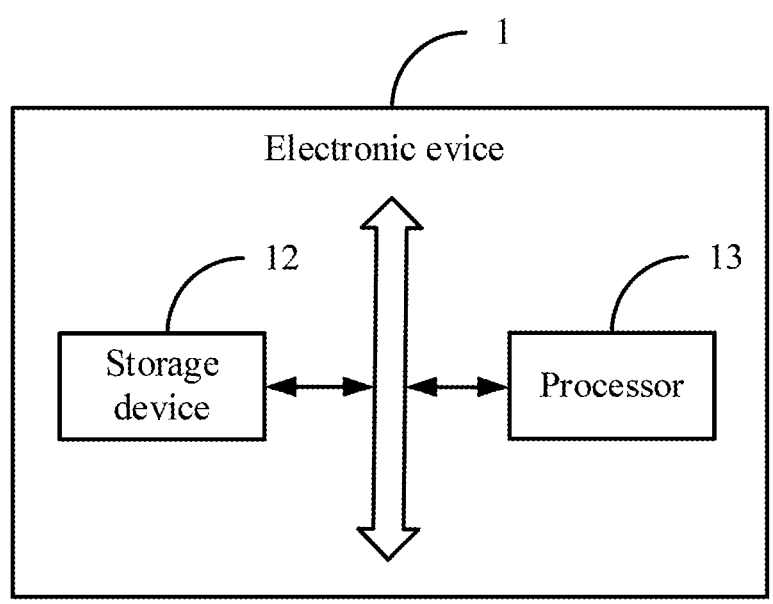
FIG. 5 is a block diagram of an embodiment of an electronic device according to the present disclosure.

FIG. 5 illustrates the electronic device 1 in one embodiment. The electronic device 1 includes, but is not limited to, a storage device 12, a processor 13, and a computer program. FIG. 5 illustrates only one example of the electronic device 1. Other examples can include more or fewer components than as illustrated or have a different configuration of the various components in other embodiments.

The processor 13 can be a central processing unit (CPU), a microprocessor, or other data processor chip that performs functions in the electronic device 1.

In one embodiment, the storage device 12 can include various types of non-transitory computer-readable storage mediums. For example, the storage device 12 can be an internal storage system, such as a flash memory, a random access memory (RAM) for the temporary storage of information, and/or a read-only memory (ROM) for permanent storage of information. The storage device 12 can also be an external storage system, such as a hard disk, a storage card, or a data storage medium.

The storage device 12 stores instructions, the processor 13 executes the computer program stored in the storage device 12 for implementing the method for training a depth recognition model and the method for recognizing depth of images provided in the embodiments of the present disclosure. The computer program can include instructions.

Upon execution of the instructions stores in the storage device 12, the processor 13 is configured to: determine test objects from obtained test images, and obtain a first image and a second image generated by a camera device capturing a plurality of initial objects; calculate a test projection slope of each of the test objects according to coordinates of each pixel point of each of the test objects in the test images, and obtain a plurality of test projection slopes of the test objects in the test images; generate a threshold range according to the plurality of test projection slopes; recognize a type of terrain corresponding to a position of each of the plurality of initial objects in the first image according to an initial projection slope of each of the plurality of initial objects in the first image and the threshold range; adjust an initial ground area in the first image according to the type of terrain and coordinates of each pixel point of the initial object, and obtain a target ground area in the first image; generate a target height loss of a preset depth recognition network according to the preset depth recognition network, the camera device, an initial depth image corresponding to the first image, and the target ground area; and adjust the preset depth recognition network according to the target height loss and a depth loss generated based on the first image and the second image, and obtain a depth recognition model for recognizing depth of images.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
   at least one processor; and
   a storage device coupled to the at least one processor and storing instructions for execution by the at least one processor to cause the at least one processor to:
   determine test objects from obtained test images, and obtain a first image and a second image generated by a camera device capturing a plurality of initial objects;
   calculate a test projection slope of each of the test objects according to coordinates of each pixel point of each of the test objects in the test images, and obtain a plurality of test projection slopes of the test objects in the test images;
   generate a threshold range according to the plurality of test projection slopes;
   recognize a type of terrain corresponding to a position of each of the plurality of initial objects in the first image according to an initial projection slope of each of the plurality of initial objects in the first image and the threshold range;
   adjust an initial ground area in the first image according to the type of terrain and coordinates of each pixel point of the initial object, and obtain a target ground area in the first image;
   generate a target height loss of a preset depth recognition network according to the preset depth recognition network, the camera device, an initial depth image corresponding to the first image, and the target ground area; and
   adjust the preset depth recognition network according to the target height loss and a depth loss generated based on the first image and the second image, and obtain a depth recognition model for recognizing depth of images.

2. The electronic device according to claim 1, wherein the at least one processor is further caused to:
   obtain an abscissa value and an ordinate value of each pixel point of each of the test objects;
   calculate an average abscissa value from the obtained abscissa values, and calculate an average ordinate value from the obtained ordinate values;
   calculate an abscissa difference value between the abscissa value of each pixel point and the average abscissa value;
   calculate an ordinate difference value between the ordinate value of each pixel point and the average ordinate value;
   determine a quantity of pixel points of each of the test objects;
   generate a covariance matrix according to a preset rule, the quantity of pixel points, a plurality of abscissa difference values, and a plurality of ordinate difference values;
   obtain at least one feature vector by performing singular value decomposition on the covariance matrix;
   determine a ratio of a first vector element to a second vector element of the at least one feature vector to be one of projection slopes; and
   select the test projection slope from the projection slopes.

3. The electronic device according to claim 2, wherein the at least one processor is further caused to:
   calculate an abscissa variance value according to the plurality of abscissa difference values and the quantity of pixel points;
   calculate an ordinate variance value according to the plurality of ordinate difference values and the quantity of pixel points;
   calculate a covariance value according to the quantity of pixel points, the plurality of abscissa difference values, and the plurality of ordinate difference values; and
   obtain the covariance matrix by arranging the covariance value, the abscissa variance value, and the ordinate variance value according to the preset rule.

4. The electronic device according to claim 1, wherein the at least one processor is further caused to:
   calculate a projection average value and a projection standard deviation of the plurality of test projection slopes;
   calculate a configuration value according to the projection standard deviation;

determine a difference value between the projection average value and the configuration value to be a minimum threshold value;

determine a sum of the projected average value and the configuration value to be a maximum threshold value; and determine a range of the minimum threshold value and the maximum threshold value to be the threshold range.

5. The electronic device according to claim 1, wherein the at least one processor is further caused to:

in response that the initial projection slope is within the threshold range, determine the type of terrain to be a flat ground; or in response that the initial projection slope is not within the threshold range, determine the type of terrain to be a slope.

6. The electronic device according to claim 5, wherein the at least one processor is further caused to:

recognize a feature ground area corresponding to any one of the plurality of initial objects in the initial ground area according to the coordinates of each pixel point of any one of the plurality of initial objects;

in response that the type of terrain corresponding to any one of the plurality of initial objects is the flat ground, determine the feature ground area to be the target ground area; or in response that the type of terrain corresponding to any one of the plurality of initial objects is the slope, obtain the target ground area by performing a mask process on the feature ground area in the initial ground area.

7. The electronic device according to claim 5, wherein the at least one processor is further caused to:

obtain a real-world height from an optical center of the camera device to the target ground area;

construct a camera coordinate system based on the first image and the camera device;

calculate a projection height according to coordinates of each ground pixel point of the target ground area in the first image in the camera coordinate system; and calculate the target height loss according to coordinates of pixel points in the initial depth image, the projection height, and the real-world height.

8. The electronic device according to claim 7, wherein the at least one processor is further caused to:

obtain coordinates of each ground pixel point in the target ground area in the camera coordinate system;

calculate a unit normal vector according to the coordinates of each the ground pixel point;

determine a vector formed by the optical center of the camera device as a starting point and each ground pixel point as an end point, and determine the vector to be a target vector of each ground pixel point;

calculate a projection distance corresponding to each ground pixel point according to the target vector of each ground pixel point and the unit normal vector; and obtain the projection height by performing a weighted average operation on all of the projection distances corresponding to all of the ground pixel points.

9. The electronic device according to claim 1, wherein the at least one processor is further caused to:

obtain at least one image to be recognized; and input the at least one image to be recognized into the depth recognition model, and obtain a target depth image and depth information of the at least one image to be recognized.

10. A method for training a depth recognition model implemented in an electronic device comprising:

determining test objects from obtained test images, and obtaining a first image and a second image generated by a camera device capturing a plurality of initial objects;

calculating a test projection slope of each of the test objects according to coordinates of each pixel point of each of the test objects in the test images, and obtaining a plurality of test projection slopes of the test objects in the test images;

generating a threshold range according to the plurality of test projection slopes;

recognizing a type of terrain corresponding to a position of each of the plurality of initial objects in the first image according to an initial projection slope of each of the plurality of initial objects in the first image and the threshold range;

adjusting an initial ground area in the first image according to the type of terrain and coordinates of each pixel point of the initial object, and obtaining a target ground area in the first image;

generating a target height loss of a preset depth recognition network according to the preset depth recognition network, the camera device, an initial depth image corresponding to the first image, and the target ground area; and adjusting the preset depth recognition network according to the target height loss and a depth loss generated based on the first image and the second image, and obtaining a depth recognition model for recognizing depth of images.

11. The method according to claim 10, wherein calculating a test projection slope of each of the test objects according to coordinates of each pixel point of each of the test objects in the test images comprises:

obtaining an abscissa value and an ordinate value of each pixel point of each of the test objects;

calculating an average abscissa value from the obtained abscissa values, and calculating an average ordinate value from the obtained ordinate values;

calculating an abscissa difference value between the abscissa value of each pixel point and the average abscissa value;

calculating an ordinate difference value between the ordinate value of each pixel point and the average ordinate value;

determining a quantity of pixel points of each of the test objects;

generating a covariance matrix according to a preset rule, the quantity of pixel points, a plurality of abscissa difference values, and a plurality of ordinate difference values;

obtaining at least one feature vector by performing singular value decomposition on the covariance matrix;

determining a ratio of a first vector element to a second vector element of the at least one feature vector to be one of projection slopes; and selecting the test projection slope from the projection slopes.

12. The method according to claim 11, wherein generating a covariance matrix according to a preset rule, the quantity of pixel points, a plurality of abscissa difference values, and a plurality of ordinate difference values comprises:

calculating an abscissa variance value according to the plurality of abscissa difference values and the quantity of pixel points;

calculating an ordinate variance value according to the plurality of ordinate difference values and the quantity of pixel points;

calculating a covariance value according to the quantity of pixel points, the plurality of abscissa difference values, and the plurality of ordinate difference values; and obtaining the covariance matrix by arranging the covariance value, the abscissa variance value, and the ordinate variance value according to the preset rule.

13. The method according to claim 10, wherein generating a threshold range according to the plurality of test projection slopes comprises:

calculating a projection average value and a projection standard deviation of the plurality of test projection slopes;

calculating a configuration value according to the projection standard deviation;

determining a difference value between the projection average value and the configuration value to be a minimum threshold value;

determining a sum of the projected average value and the configuration value to be a maximum threshold value; and determining a range of the minimum threshold value and the maximum threshold value to be the threshold range.

14. The method according to claim 10, wherein recognizing a type of terrain corresponding to a position of each of the plurality of initial objects in the first image according to an initial projection slope of each of the plurality of initial objects in the first image and the threshold range comprises:

in response that the initial projection slope is within the threshold range, determining that the type of terrain to be a flat ground; or in response that the initial projection slope is not within the threshold range, determining the ground type to be a slope.

15. The method according to claim 10, wherein adjusting an initial ground area in the first image according to the type of terrain and coordinates of each pixel point of the initial object, and obtaining a target ground area in the first image comprises:

recognizing a feature ground area corresponding to any one of the plurality of initial objects in the initial ground area according to the coordinates of each pixel point of any one of the plurality of initial objects;

in response that the type of terrain corresponding to any one of the plurality of initial objects is the flat ground, determining the feature ground area to be the target ground area; or in response that the type of terrain corresponding to any one of the plurality of initial objects is the slope, obtaining the target ground area by performing a mask process on the feature ground area in the initial ground area.

16. The method according to claim 15, wherein generating a target height loss of the depth recognition network based on the preset depth recognition network, the camera device, the initial depth image corresponding to the first image, and the target ground area comprises:

obtaining a real-world height from an optical center of the camera device to the target ground area;

constructing a camera coordinate system based on the first image and the camera device;

calculating a projection height according to coordinates of each ground pixel point of the target ground area in the first image in the camera coordinate system; and calculating the target height loss according to coordinates of pixel points in the initial depth image, the projection height, and the real-world height.

17. The method according to claim 16, wherein calculating a projection height according to coordinates of each ground pixel point of the target ground area in the first image in the camera coordinate system comprises:

obtaining coordinates of each ground pixel point in the target ground area in the camera coordinate system;

calculating a unit normal vector according to the coordinates of each the ground pixel point;

determining a vector formed by the optical center of the camera device as a starting point and each ground pixel point as an end point, and determining the vector to be a target vector of each ground pixel point;

calculating a projection distance corresponding to each ground pixel point according to the target vector of each ground pixel point and the unit normal vector; and obtaining the projection height by performing a weighted average operation on all of the projection distances corresponding to all of the ground pixel points.

18. The method according to claim 10, further comprising:

obtaining at least one image to be recognized; and inputting the at least one image to be recognized into the depth recognition model, and obtaining a target depth image and depth information of the at least one image to be recognized.

19. A non-transitory computer-readable storage medium having instructions stored thereon, when the instructions are executed by a processor of an electronic device, the processor is configured to perform a method for training a depth recognition model, wherein the method comprises:

determining test objects from obtained test images, and obtaining a first image and a second image generated by a camera device capturing a plurality of initial objects;

calculating a test projection slope of each of the test objects according to coordinates of each pixel point of each of the test objects in the test images, and obtaining a plurality of test projection slopes of the test objects in the test images;

generating a threshold range according to the plurality of test projection slopes;

recognizing a type of terrain corresponding to a position of each of the plurality of initial objects in the first image according to an initial projection slope of each of the plurality of initial objects in the first image and the threshold range;

adjusting an initial ground area in the first image according to the type of terrain and coordinates of each pixel point of the initial object, and obtaining a target ground area in the first image;

generating a target height loss of a preset depth recognition network according to the preset depth recognition network, the camera device, an initial depth image corresponding to the first image, and the target ground area; and adjusting the preset depth recognition network according to the target height loss and a depth loss generated based on the first image and the second image, and obtaining a depth recognition model for recognizing depth of images.

20. The non-transitory computer-readable storage medium according to claim 19, wherein calculating a test projection slope of each of the test objects according to coordinates of each pixel point of each of the test objects in the test images comprises:
- obtaining an abscissa value and an ordinate value of each pixel point of each of the test objects;
- calculating an average abscissa value from the obtained abscissa values, and calculating an average ordinate value from the obtained ordinate values;
- calculating an abscissa difference value between the abscissa value of each pixel point and the average abscissa value;
- calculating an ordinate difference value between the ordinate value of each pixel point and the average ordinate value;
- determining a quantity of pixel points of each of the test objects;
- generating a covariance matrix according to a preset rule, the quantity of pixel points, a plurality of abscissa difference values, and a plurality of ordinate difference values;
- obtaining at least one feature vector by performing singular value decomposition on the covariance matrix;
- determining a ratio of a first vector element to a second vector element of the at least one feature vector to be one of projection slopes; and
- selecting the test projection slope from the projection slopes.

* * * * *